United States Patent
Itohara et al.

(10) Patent No.: US 9,459,342 B2
(45) Date of Patent: Oct. 4, 2016

(54) RADAR DEVICE

(71) Applicants: Furukawa Electric Co., Ltd., Tokyo (JP); Furukawa Automotive Systems Inc., Shiga (JP)

(72) Inventors: Hiroyuki Itohara, Tokyo (JP); Yasushi Aoyagi, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 448 days.

(21) Appl. No.: 14/035,618

(22) Filed: Sep. 24, 2013

(65) Prior Publication Data

US 2014/0022110 A1    Jan. 23, 2014

Related U.S. Application Data

(63) Continuation of application No. PCT/JP2012/056251, filed on Mar. 12, 2012.

(30) Foreign Application Priority Data

Mar. 24, 2011    (JP) .................. 2011-066053

(51) Int. Cl.
*G01S 13/66*    (2006.01)
*G01S 7/295*    (2006.01)
(Continued)

(52) U.S. Cl.
CPC .............. *G01S 13/66* (2013.01); *G01S 7/295* (2013.01); *G01S 13/58* (2013.01); *G01S 13/72* (2013.01)

(58) Field of Classification Search
CPC ........ G01S 13/66; G01S 13/58; G01S 13/72; G01S 7/295
USPC .......... 342/107, 108, 70-72, 90, 95-97, 195
See application file for complete search history.

(56) References Cited

U.S. PATENT DOCUMENTS 5,389,936 A * 2/1995 Alcock ..................... G01S 5/04
342/450
6,260,759 B1 * 7/2001 Nguyen .................. G01S 7/066
235/411

(Continued)

FOREIGN PATENT DOCUMENTS

EP    1 094 336 A2    4/2001
JP    2001-099924 A    4/2001

(Continued)

OTHER PUBLICATIONS

Anoop Kumar, K.; Arvind, M.; Divakar, K.; Rajagopal, R., "A novel time-frequency approach for acceleration estimation from a single PRI," in Signal Processing and its Applications, 1999. ISSPA '99. Proceedings of the Fifth International Symposium on , vol. 2, No., pp. 531-534 vol. 2, 1999.*

(Continued)

*Primary Examiner* — John B Sotomayor
(74) *Attorney, Agent, or Firm* — Oblon, McClelland, Maier & Neustadt, L.L.P.

(57) ABSTRACT

A radar device capable of reducing load of a clustering process and improving the tracking performance is provided.

A tracking calculation unit 116 of a radar device 100 performs a clustering process, in which an input detected data set is grouped into clusters, and a tracking process, in which an averaged value and a prediction value are calculated for each of the clusters. In the radar device 100, the shape of cluster areas for grouping the detected data is defined to be a fan shape. The clustering process and tracking process using fan-shaped cluster areas can reduce the load of the clustering process and improve the tracking performance.

9 Claims, 7 Drawing Sheets

(51) Int. Cl.
*G01S 13/58* (2006.01)
*G01S 13/72* (2006.01)

(56) References Cited

U.S. PATENT DOCUMENTS

| | | | |
|---|---|---|---|
| 6,518,916 B1 | 2/2003 | Ashihara et al. | |
| 6,567,039 B2* | 5/2003 | Shirai | G01S 13/931 |
| | | | 180/167 |
| 6,664,920 B1* | 12/2003 | Mott | G01S 13/343 |
| | | | 342/129 |
| 6,753,805 B2* | 6/2004 | Nakanishi | G01S 7/35 |
| | | | 342/109 |
| 6,859,546 B2* | 2/2005 | Matsukawa | G06K 9/00818 |
| | | | 342/90 |
| 7,231,194 B2* | 6/2007 | Vartiainen | H04B 17/24 |
| | | | 455/227 |
| 7,509,217 B2 | 3/2009 | Endoh | |
| 7,586,436 B2* | 9/2009 | Wakayama | G01S 13/48 |
| | | | 342/107 |
| 7,750,840 B2 | 7/2010 | Wood et al. | |
| 8,446,254 B2* | 5/2013 | Carrick | G01S 5/14 |
| | | | 340/10.1 |
| 8,606,539 B2* | 12/2013 | Takabayashi | G06K 9/00798 |
| | | | 180/169 |
| 8,744,664 B2* | 6/2014 | Day | G05D 1/0278 |
| | | | 701/25 |
| 8,761,445 B2* | 6/2014 | Shamir | G06K 9/6293 |
| | | | 348/143 |
| 2006/0089799 A1 | 4/2006 | Endoh | |
| 2007/0008210 A1* | 1/2007 | Kibayashi | G01S 13/931 |
| | | | 342/70 |
| 2008/0019567 A1* | 1/2008 | Takagi | G06K 9/00369 |
| | | | 382/103 |
| 2009/0140909 A1 | 6/2009 | Wood et al. | |
| 2010/0283666 A1* | 11/2010 | Lee | G01S 7/021 |
| | | | 342/175 |
| 2011/0102242 A1 | 5/2011 | Takeya et al. | |
| 2014/0022110 A1* | 1/2014 | Itohara | G01S 7/295 |
| | | | 342/107 |

FOREIGN PATENT DOCUMENTS

| | | |
|---|---|---|
| JP | 4151631 | 7/2008 |
| JP | 2009-002799 A | 1/2009 |
| JP | 2009-047550 A | 3/2009 |
| JP | 4475566 B | 3/2010 |
| WO | WO 2010/137390 A1 | 12/2010 |

OTHER PUBLICATIONS

Blasch, E.P.; Straka, O.; Dunik, J.; Simandl, M., "Multitarget tracking performance analysis using the non-credibility index in the Nonlinear Estimation Framework (NEF) toolbox," in Aerospace and Electronics Conference (NAECON), Proceedings of the IEEE 2010 National, vol., No., pp. 107-115, Jul. 14-16, 2010.*

Office Action issued Jun. 26, 2015 in Chinese Patent Application No. 201280012420.0 (with English language translation).

Office Action issued Oct. 22, 2014 in Chinese Patent Application No. 201280012420.0 (with English language translation).

Extended Search Report issued Jul. 14, 2014 in European Patent Application No. 12761206.7.

International Search Report mailed Apr. 10, 2012 for PCT/JP2012/056251 filed on Mar. 12, 2012 with English Translation.

* cited by examiner

POSITION OF RADAR DEVICE 100

| CLUSTER SHAPE | | CALCULATION LOAD* |
|---|---|---|
| CIRCLE | ○ | 1.0 |
| RECTANGLE (WITHOUT LEAN) | ▭ | 6.1 |
| RECTANGLE (WITH LEAN) | ▱ | 8.3 |
| FAN SHAPE | ⌒ | 0.1 |

\* COMPARE WHERE CALCULATION LOAD
WHEN CIRCULAR CLUSTER IS USED IS SET TO 1

(CIRCLE)

(ELLIPSE)

(SQUARE)

(RECTANGLE)

DETECTION SIGNAL
FROM VEHICLE (TARGET)    RADAR POSITION

RADAR DEVICE

CROSS-REFERENCE TO RELATED APPLICATIONS

The present application is a continuation application of International Application No. PCT/JP2012/056251, filed on Mar. 12, 2012, and claims the benefit of foreign priority under 35 U.S.C. §119 to Japanese Application No. JP 2011-066053, filed on Mar. 24, 2011.

TECHNICAL FIELD

The present invention relates to a radar device that obtains an detected data set by receiving reflected waves of transmission signals, the transmission signals being radiated at a predetermined time interval and the reflected waves being reflected by targets, and that tracks the targets by processing the detected data set.

BACKGROUND ART

A radar device used for a vehicle or other uses radiates a radio wave and receives a reflected signal that is the radio wave reflected by a target to be detected, and detects position information of the targets including a distance, angle, and the like from the information of the received signal. The detected position information may be used as is. But in the case, unintended target may be detected, or a target that should be properly detected may not be able to be detected due to noise or the like.

Therefore, a usual radar device performs a clustering process and a tracking process on obtained information. The clustering process is a process for grouping the signals detected in an detection cycle, and for defining each group (cluster) as a set of signals reflected by one object. For grouping the detected signals, a process for setting ranges of a predetermined shape, and defining a set of signals in each of the ranges as one cluster is performed. As a shape of ranges used for the clustering process (cluster shape), shapes such as circle, ellipse, and rectangle illustrated in FIGS. 8A-8D are often used conventionally.

In the tracking process, a process for comparing a cluster set obtained in the clustering process with positions of all targets that have been obtained so as to determine which target each of the clusters belong to, and based on the determination result, smoothing (averaging) positions for each of the targets and predicting a position next time. Generally, for smoothing or prediction of positions in the tracking process, $\alpha$-$\beta$ filter technique or Kalman filter technique are widely used.

Depending on the type of the radar, the radar can output position information (distance/angle) of targets and can also output relative speed information of the target as viewed from the radar (Doppler radar device, for example). However, the relative speed information has not been conventionally output because a processing load increases, and thus it becomes hard to complete all processes within a predetermined time, for example, if the clustering process is performed also using the relative speed information.

A clustering process and tracking process disclosed in Patent Literatures 1 to 3 are known as those performed in conventional radar devices. Patent Literature 1 reports a method for reducing a process for obtaining a correlation between position information obtained in every detection cycle and information of targets that has been obtained in the tracking process. In Patent Literature 1, the shape of clusters that are sets of position information of targets is not specified.

Patent Literature 2 discloses a technique to detect obstacles from captured images obtained by a camera. It is described that a set of candidate points to be detected having their image positions in a predetermined range is defined as one cluster, but the shape of the predetermined range is not particularly defined. In Patent Literature 3, an example where the cluster shape is defined to be rectangular or elliptical is disclosed, but the shape of an area when a size of a plot set is obtained does not matter and the shape is not specified.

CITATION LIST

Patent Literature

Patent Literature 1: Japanese Patent No. 4475566
Patent Literature 2: Japanese Patent No. 4151631
Patent Literature 3: Japanese Patent Application Laid-Open No. 2009-2799

SUMMARY OF INVENTION

Technical Problem

As described above, any conventional technique particularly specifying a preferred shape as a cluster shape is not known, and a simple shape such as circle, square, and rectangle, which seem to be easily used, is conventionally used. However, the performance of the clustering process is significantly affected by a cluster shape, and a clustering process using an inappropriate shape cannot appropriately identify a target. For example, when a vehicle or a human is defined as a target, the distribution of detection signals at a given time often extends in a horizontal direction as illustrated in FIG. 9. In this case, if a conventionally used circle, square, rectangle, or the like is used as a cluster shape, one target may be recognized as divided in two or more, or the cluster shape has to be defined to be far larger than the actual size of targets in order to avoid such recognition, which are problems.

In addition, in a signal process of a radar, a polar coordinate system, in which position information is indicated using a distance (r) from the radar and an angle ($\theta$) from the center line, is usually used, but position information in the polar coordinate system has to be converted to the rectangular coordinate system (x, y) in order to use circle, square, rectangle, or the like as a cluster shape, which causes a problem of an increasing process load. Thus, it has been difficult to perform a clustering process using relative speed information since the process load is big.

Further, since a clustering process using relative speed information is not possible, if a plurality of targets moving at different speeds comes close to each other at a time point, for example, detected data at the time point may be unfortunately grouped as one cluster (one target). In this case, the plurality of targets cannot be identified, and a problem of lowering the tracking performance is caused.

The present invention is made in view of the above-described problems, and an object thereof is to provide a radar device capable of reducing the load of a clustering process, and improving the tracking performance.

Solution to Problem

In order to solve the above-described problems, a radar device of a first aspect of the present invention is a radar device that radiates a transmission signal from a predetermined measure point, receives reflected waves that have been reflected by targets to be measured to obtain detected data including at least position information, and detect the targets by processing the detected data, the radar device including a tracking processing unit that groups the detected data into one or more areas (referred to as cluster areas below) using at least the position information, that defines each of the areas as one of clusters, that performs a clustering process, in which a central value (gravity center, for example) of each of the clusters is calculated, and that performs a tracking process, in which each of the targets is defined as one item, a distance between a position of each of the items that have been detected and the central value of each of the clusters is calculated, if the distance for any of the items is determined to be a predetermined value or less, the cluster is determined to correspond to the item, and if the distances from all of the items that have been detected are more than the predetermined value, the cluster is determined as a new item, an averaged position that is the position, which has been averaged, is calculated using the central value of the cluster for each of the items, wherein each of the cluster areas is a fan-shaped cluster area that has a center at the measure point and that is surrounded by: two arcs having identical center angles and different radii; and two line segments on radii.

In a radar device according to another aspect of the present invention, the detected data includes relative speed information of the target as viewed from the measure point, in the clustering process, the detected data having the relative speeds included in an identical relative speed range are grouped into one of the clusters that is identical, and an average speed that is an average of the relative speeds is calculated for each of the clusters, and in the tracking process, if a difference between an averaged speed of the item and the average speed of the cluster is in a predetermined range, the cluster is determined to correspond to the item, and the averaged speed is calculated using the average speed of the cluster for each of the items.

In a radar device according to another aspect of the present invention, the transmission signal is a pulse signal having a predetermined pulse width.

In a radar device according to another aspect of the present invention, the pulse signal is an Ultra Wide Band (UWB) radio signal.

Advantageous Effects of Invention

According to the present invention, it is possible to provide a radar device capable of reducing the load of the clustering process, and improving the tracking performance.

DESCRIPTION OF EMBODIMENTS

Figure 1:
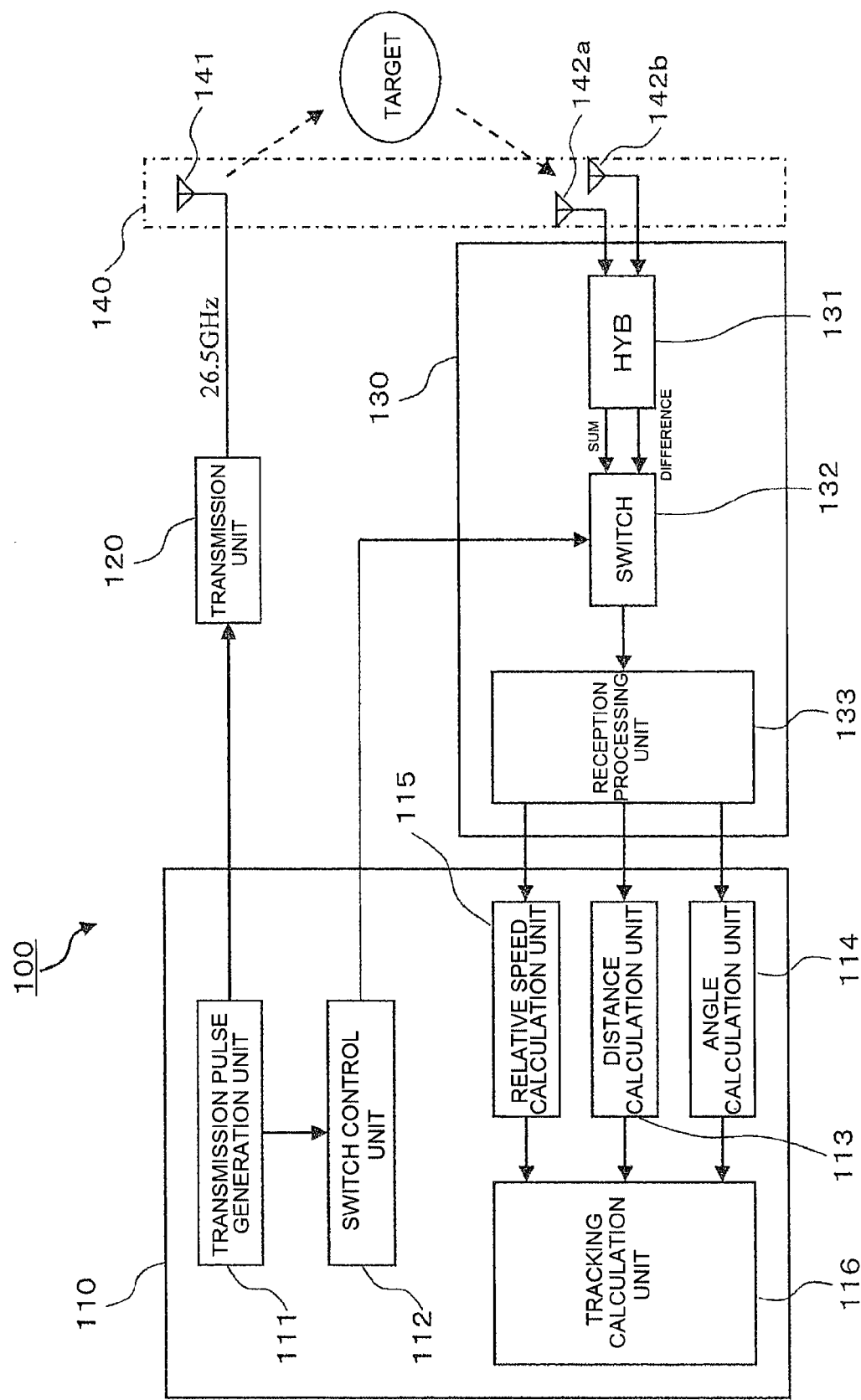
FIG. 1 is a block diagram illustrating a configuration of a radar device according to a first embodiment of the present invention.

A radar device according to a preferred embodiment of the present invention will be described in detail referring to the attached drawings. For simplification of illustration and description, identical reference numerals designate respective components having an identical function.

First Embodiment

A radar device according to a first embodiment of the present invention will be described below referring to FIG. 1. FIG. 1 is a block diagram illustrating a configuration of a radar device 100 according to this embodiment. The radar device 100 includes: a signal processing unit 110 that generates a pulse signal for transmission and processes an detected data set; a transmission unit 120 that generates a transmission signal based on the pulse signal input from the signal processing unit 110; a reception unit 130 that processes reception signals to convert them into the detected data set of digital signal; and a an antenna section 140 having a transmission antenna 141 that radiates the transmission signal into space and a reception antenna 142 that receives a reflected wave that has been reflected by a target.

More specifically, the signal processing unit 110 includes a transmission pulse generation unit 111; a switch control unit 112; a distance calculation unit 113; an angle calculation unit 114; a relative speed calculation unit 115; and a tracking calculation unit 116. The transmission pulse generation unit 111 outputs pulse signals having a pulse width of about 1 ns at a predetermined time interval to the transmission unit 120, for example. When the pulse signal is input to the transmission unit 120 from the transmission pulse generation unit 111, the transmission unit 120 generates a transmission signal that is a radio signal of an Ultra Wide Band (UWB) of a quasi-millimeter wave band (26.5 GHz, for example) based on the input pulse signal.

The transmission signal of an Ultra Wide Band generated by the transmission unit 120 is radiated into space from the transmission antenna 141. The transmission signal is reflected by a target in a predetermined area where the transmission signal has been radiated, and this reflected wave is received by the reception antenna 142. The radar device 100 is configured to include two antennas 142$a$, 142$b$ as the reception antenna 142 in order to enable detection of a distance and a direction (angle) to the target.

The reception unit 130 includes: a hybrid (HYB) 131; a switch 132; and a reception processing unit 133. Two reception signals received by the reception antenna 142$a$, 142$b$ are input to the hybrid (HYB) 131, and the hybrid (HYB) 131 generates a sum signal and a difference signal of the reception signals. The sum signal and difference signal output from the hybrid (HYB) 131 are temporally segmented by the switch 132 and input to the reception processing unit 133. In this embodiment, the radar device is configured to sample the reception signal by an equivalent sampling approach, and the switch control unit 112 performs a close control of the switch 132 at predetermined timing.

The switch control unit 112 determines timing for sampling the reception signal in synchronization with output of pulse signals from the transmission pulse generation unit 111, and outputs a signal for close control to the switch 132. Thus, at the above-described timing, the switch 132 is turned to close state and the hybrid (HYB) 131 outputs the sum signal and the difference signal to the reception processing unit 133. The reception processing unit 133 converts the sum signal and difference signal of a quasi-millimeter wave band input from the hybrid (HYB) 131 to baseband signals, digitizes the signals by an A/D converter or the like (not illustrated), and outputs the converted signals to the signal processing unit 110.

The signals digitized by the reception processing unit 133 are output to the distance calculation unit 113, the angle calculation unit 114, and the relative speed calculation unit 115 of the signal processing unit 110, and a distance, angle, and relative speed of the target are respectively calculated. The data of the distance, angle, and relative speed that have been calculated are output as an detected data set to the tracking calculation unit 116. The tracking calculation unit 116 performs a clustering process, in which the input detected data set is grouped into clusters, and a tracking process, in which data are averaged and a prediction value is calculated for each of the clusters.

In the radar device 100 of this embodiment, an equivalent sampling approach is used to sample the reception signal as described above. In the equivalent sampling approach, the reception signal is sampled at a constant time interval for one pulse of the transmission signal, and a time to start sampling is shifted slightly for each one pulse (shifted time is indicated by $\alpha$). The process is performed throughout multiple pulse signal radiations (hereinafter referred to as one scan), whereby a sampling result that is similar to a result of sampling at a time interval a can be obtained.

As an example of one scan, it is assumed that a pulse signal is output from the transmission pulse generation unit 111 at an interval of 1 ms and if the pulse signal output is continuously performed for 50 ms, for example, then equivalent sampling is performed on reception signals obtained by 50 times of pulse signal output per one scan. Note that the time interval for outputting a pulse signal and the number of times of pulse signal output for one scan are not limited to those described above and may be appropriately set.

Detected data set output to the tracking calculation unit 116 by the above-described sampling extends corresponding to the sizes, shapes, and the like of respective targets. Therefore, a clustering process for grouping detected data, which are determined to correspond to the same target, into one cluster is performed. Conventionally, a cluster to which detected data belongs is determined by setting an area of a shape such as circle or rectangle as illustrated in FIGS. 8A-8D for each cluster, and then by determining which area includes the detected data based on position information (distance, angle).

However, in a radar device, detected data are conventionally processed in a polar coordinate system having the center at the position of the radar device. Therefore, heavy load is on the process of position information if the cluster shape is set to circle, rectangle, or the like. In addition, an error of angle data such as azimuth angles tend to be larger comparing to distance data, and thus detected data corresponding to one target tend to extend in a direction of azimuth angle.

Figures 2, 3:
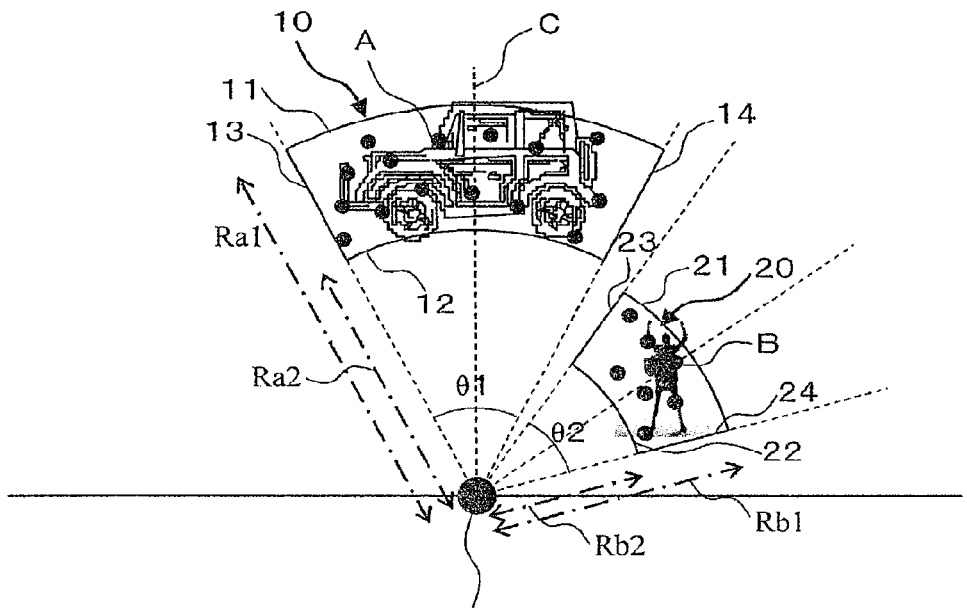
FIG. 2 illustrates a shape of a cluster area used in the radar device according to the first embodiment.
FIG. 3 illustrates an example of a relationship between shapes of a cluster area and calculation loads.

Therefore, in the radar device 100 according to this embodiment, the shape of the cluster areas for grouping detected data is defined to be a fan shape as illustrated in FIG. 2. FIG. 2 illustrates cluster areas 10, 20 for two respective targets A, B as an example. For the target A, an area surrounded by: two arcs 11, 12 having their centers at the position of the radar device 100 and having different radii Ra1, Ra2; and two line segments 13, 14 on radii at different center angles by $\theta 1$ is defined as a cluster area 10 for the target A. The fan-shaped cluster area illustrated in FIG. 2 is hereinafter referred to as the fan-shaped cluster area 10.

Similarly, also for the target B, an area surround by: two arcs 21, 22 having different radii Rb1, Rb2; and two line segments 23, 24 on radii at different center angles by $\theta 2$ is defined as a fan-shaped cluster area 20 for the target B. In FIG. 2, the target A is positioned on the front direction of the radar device 100. In this case, the fan-shaped cluster area 10 is formed to be bilaterally symmetric about a center axis C (without any lean with respect to the radar device 100). On the other hand, the target B is positioned on a direction shifted from the front direction of the radar device 100 by a predetermined angle. In this case, the fan-shaped cluster area 20 is arranged to lean by the predetermined angle with respect to the radar device 100.

When a cluster area has a fan shape as described above, the cluster area can be indicated using a radius and a center angle, and thus position information (distance, angle) can be handled in the polar coordinate system without any conversion. As a result, the process load for position information can be significantly lowered, and thus there can be an excess processing power of the tracking calculation unit 116. Therefore, the radar device 100 of this embodiment is configured to perform the clustering process using not only position information but also speed information, which enables highly accurate tracking process. In the clustering process also using speed information, detected data that are determined to belong to the same cluster when grouped based only on position information are grouped into different clusters if their relative speeds seen from the radar device 100 are significantly different. Which means that the detected data are grouped into the predetermined cluster only when their position information is included in a predetermined fan-shaped cluster area and their relative speeds are in a predetermined range.

The size of a fan-shaped cluster area can be set appropriately. For example, a fan-shaped cluster area larger than that for a target that is at a shorter distance from the radar device 100 may be set to a target that is at a long distance from the radar device 100. This setting is made considering that the longer the distance from the radar device 100 is, the more the signal to noise ratio of a reception signal reflected by a target is deteriorated. In particular, when the distance from the radar device 100 becomes larger, the variation of azimuth angle tends to be larger, and thus the detected data tend to extend in a fan shape. Therefore, by setting fan-shaped cluster areas having appropriately set center angles, detected data can be preferably grouped.

Note that, in the above description, fan-shaped cluster areas are used for the clustering process, but the shape is not limited thereto and cluster areas of any shape such as circle/square/rectangle which are used in the conventional technique may be used depending on distribution of detected data.

In the radar device 100 of this embodiment, fan-shaped cluster areas are used for the clustering process, and thus the load of the clustering process by a calculation process in the polar coordinate system similar to the conventional technique can be significantly reduced. As an example, the calculation load of the clustering process by the radar device 100 is shown in FIG. 3 comparing with the calculation loads when the conventional cluster areas are used.

As examples of conventional cluster areas, FIG. 3 illustrates a circular cluster area, a rectangular cluster area without any lean with respect to the radar device, and a rectangular cluster area leaning with respect thereto. In FIG. 3, the calculation loads are shown as relative values where the calculation load when the circular cluster area is used is set to 1. As shown in FIG. 3, the calculation load is significantly reduced when the fan-shaped cluster area is used compared to the case where a cluster area having any of the conventional shapes is used. In addition, when the conventional rectangular cluster area is used, whether the cluster area leans or does not lean with respect to the radar device significantly affects the calculation load, but when the fan-shaped cluster area is used, leaning has little effect on the calculation load.

When detected data are grouped into one or more clusters by the clustering process, a gravity center (central value) and an average speed of each of the clusters are calculated. In the next tracking process, it is determined whether each of the clusters into which the detected data are grouped by the clustering process is positioned close to any of targets that have been obtained. Then, the current positions of the respective targets are predicted, and from the predicted current positions and the gravity centers of the clusters, averaged positions of the targets are calculated. In addition, from the speeds of the respective targets and the average speeds of the clusters, averaged speeds of the targets are calculated.

In order to calculate an averaged value and a prediction value of position and speed, a α-β tracking method is used in this embodiment. In the α-β tracking method, an averaged value and a prediction value of position and speed of a target are calculated by the following equations where a sampling interval is a constant time length T, and a sampling time is $t_k=kT$ (k=1, 2, 3 . . . ).

Averaged Position: $x_{sk}=x_{pk}+\alpha(x_{ok}-x_{pk})$

Averaged Speed: $v_{sk}=v_{sk-1}+\beta(v_{ok}-v_{pk})$

Prediction Position: $x_{pk}=x_{sk-1}+T \cdot v_{sk-1}$

Prediction Speed: $v_{pk}=v_{sk-1}$ (1)

In the equations, $x_{sk}$ represents a position averaged value, $x_{pk}$ represents a position prediction value, $x_{ok}$ represents a position measured value, $v_{sk}$ represents a speed averaged value, $v_{pk}$ represents a speed prediction value, $v_{ok}$ represents a speed measured value, and α and β respectively represent gains related to prediction dependencies of position and speed, when each of the values is obtained at time $t_k$. The position measured value $x_{ok}$ is a gravity center of a cluster that has been determined to correspond to each target, and the speed measured value $v_{ok}$ is an average speed of detected data belonging to the cluster.

Figure 4:
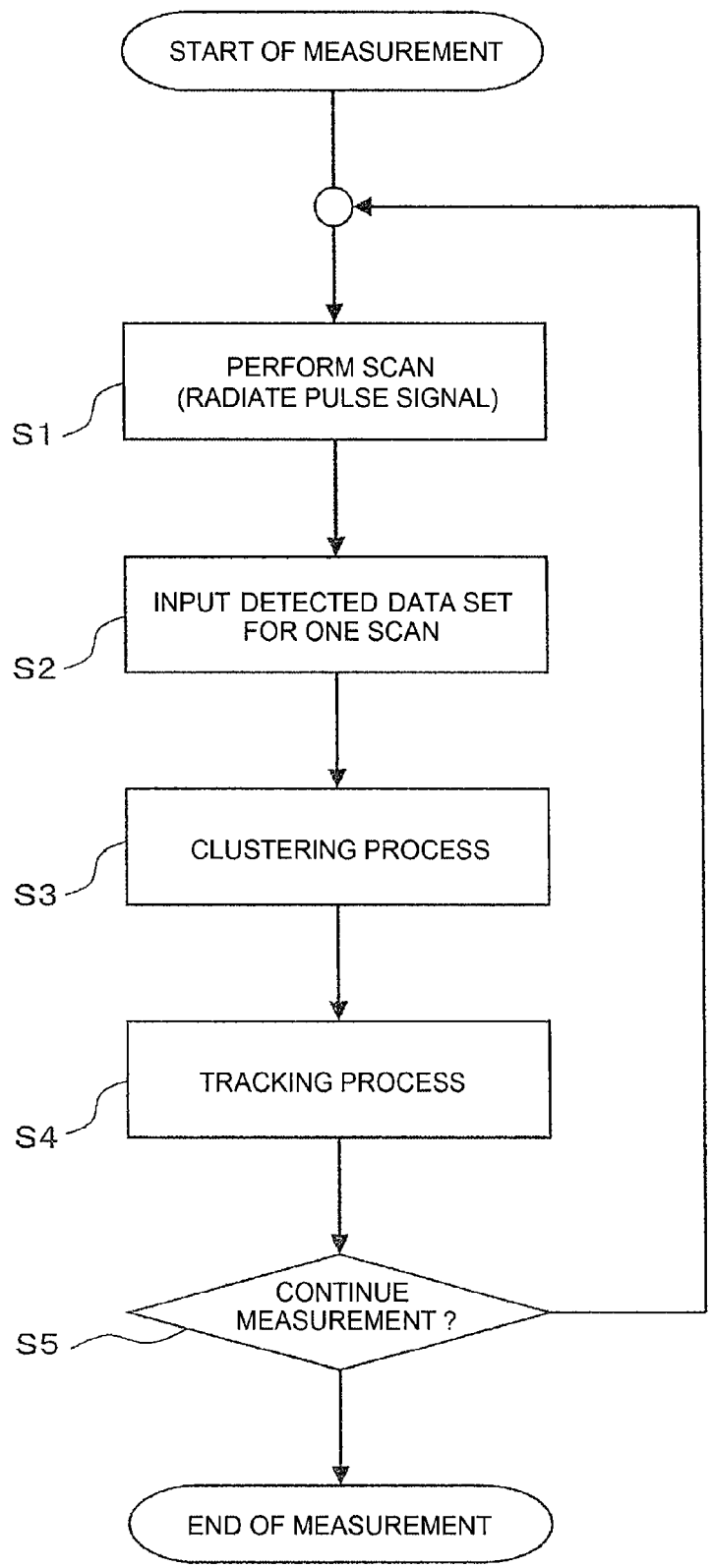
FIG. 4 is a flowchart schematically illustrating a flow of a process of the radar device according to the first embodiment.
Figure 5:
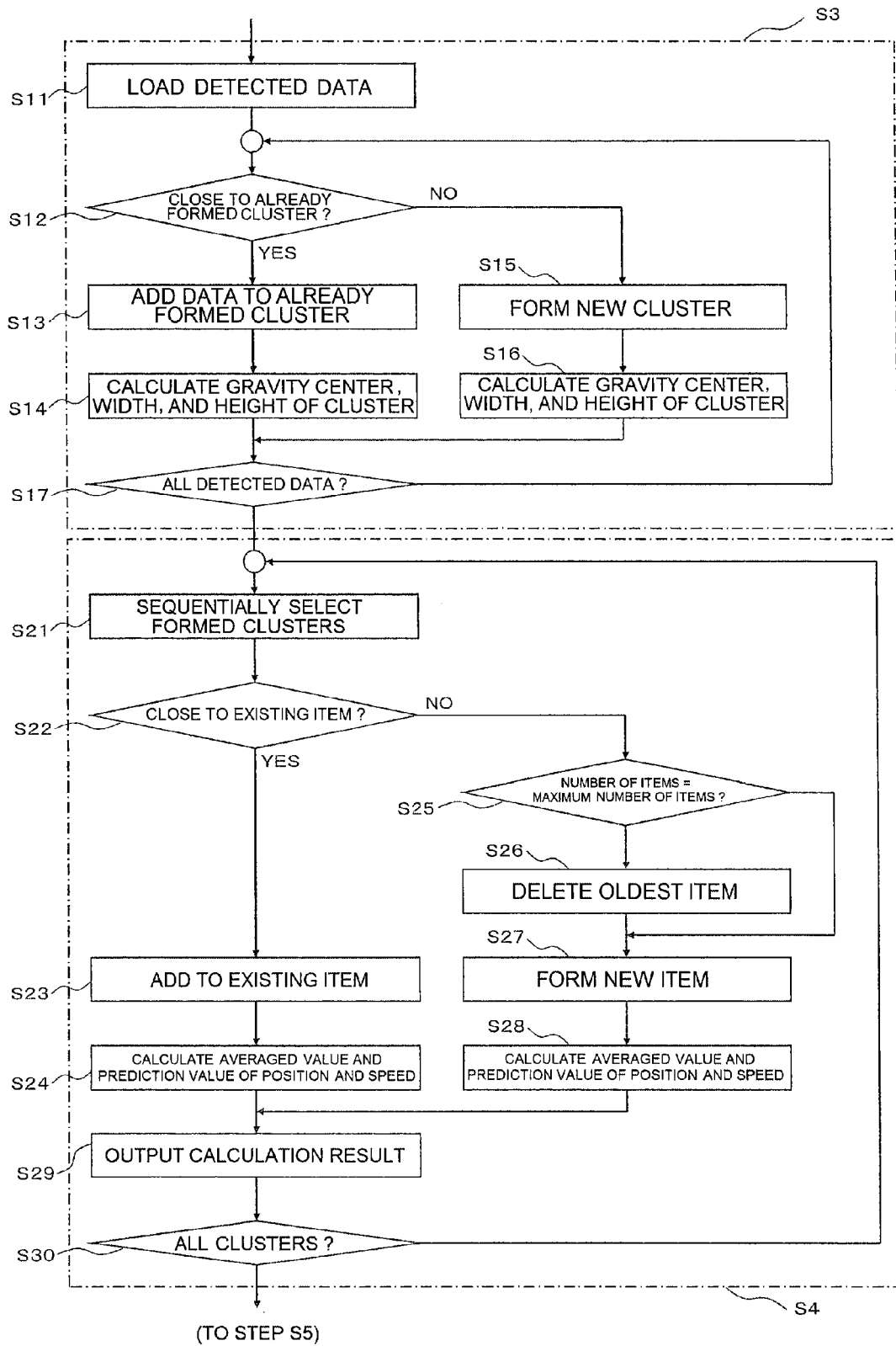
FIG. 5 is a flowchart illustrating a flow of a process of a tracking calculation unit according to the first embodiment in detail.

A method of measuring a target by the radar device 100 will be described using flowcharts illustrated in FIGS. 4 and 5. FIG. 4 is a flowchart schematically illustrating a flow of the process for measuring the target using the radar device 100. FIG. 5 is a flowchart for describing a signal processing method performed by a tracking calculation unit 116 in detail. In the tracking calculation unit 116, the above-described clustering process and tracking process are performed on an detected data set obtained at every scan.

In FIG. 4, after the start of measuring a target by the radar device 100, a scan is first performed by radiation of a pulse signal in step S1. This scan is performed by a radiation of the transmission signal from the transmission antenna 141 at a predetermined time interval for a predetermined time length (predetermined number of times). For each transmission signal, reflected waves thereof are received, and the distance calculation unit 113, the angle calculation unit 114, and the relative speed calculation unit 115 respectively calculate data of distances, angles, and relative speeds and these data are stored as an detected data set.

When one scan finishes in step S1, the stored detected data set is input to the tracking calculation unit 116 in step S2. Then in step S3, a clustering process of the input detected data set is performed. In the clustering process, cluster areas into which the detected data set is grouped are formed, and then the respective detected data are sorted into the respective clusters.

In next step S4, it is determined to which one of the detected targets each of the clusters formed in step S3 corresponds. Then, the tracking process, in which an averaged position, an averaged speed, and the like are calculated, is performed for each of the targets. When the tracking process finishes for all of the targets in step S4, it is determined whether to continue the measurement in step S5. If it is determined that the measurement is to be continued, the process returns to step S1 to perform a next scan. The determination in step S5 may be made in such a manner that the measurement is continued when a scan request from a user is on and the measurement is finished when the scan request is off, for example.

Next, FIG. 5 is a flowchart for describing a signal process method performed by the tracking calculation unit 116 in detail. Among the schematic flow of the process illustrated in FIG. 4, the clustering process in step S3 and the tracking process in step S4 are here described in detail.

First, as the clustering process, the process of the steps S11 to S17 is performed. In step S11, detected data are loaded one by one from the detected data set input in step S2 illustrated in FIG. 4. Then, in step S12, based on a position datum of the loaded detected datum, it is determined whether the detected datum is close to an area of an already formed cluster, that is, whether the detected datum is within a predetermined distance from the area of the already formed cluster. At this time, it is also determined whether its speed is included in a speed range of the already formed cluster.

In step S12, if it is determined that the detected datum is close to the area of the already formed cluster, the detected datum is added to the already formed cluster in step S13. Then, in step S14, the gravity center of the already formed cluster is updated based on the detected datum newly added to the already formed cluster and the detected data that have been included therein until then. In addition, the width and the height of the cluster area are updated in such a manner that the newly added detected datum is included in the area of the already formed cluster. Then, the process proceeds to step S17.

On the other hand, if it is determined that the detected datum is not close to any of the already formed clusters, a new cluster is formed in step S15. In next step S16, the gravity center, width, and height of the new cluster are calculated. For the gravity center of the new cluster, the position information of the loaded detected datum is set. For the width and height, default values that are set beforehand may be set. When the process of step S16 finishes, the process proceeds to step S17. In step S17, it is determined whether the processes for all of the detected data set input in step S2 are finished. If all processes have finished, the process proceeds to step S21, and on the other hand, if there remains any detected datum not yet processed, the process returns to step S11 to perform a process on a next detected datum.

Next, the tracking process is hereinafter described in detail. Each of the clusters formed in the above-described clustering process is for grouped detected data that correspond to one target. Therefore, in a first scan, each of the clusters of the cluster set formed in the clustering process is stored as one item. In a second and subsequent scans, it is determined whether each of the clusters formed in the clustering process corresponds to any already formed item, and then the tracking process is performed for each of the items.

First, in step S21, the clusters formed by the above-described clustering process are sequentially selected one by one. In next step S22, it is determined whether the selected cluster is close to any one of the existing items. This determination can be made depending on whether the distance between the gravity center of the selected cluster and the averaged position of each of the existing items is a predetermined value or less. At this time, whether the difference of their speeds is a predetermined value or less may also be a condition. If it is determined that the cluster is close to an existing item, the process proceeds to step S23. On the other hand, if it is determined that the cluster is not close to any existing item, the process proceeds to step S25.

If it is determined that the cluster selected in step S22 is close to an existing item, the selected cluster is added to the existing item in step S23. Which means that an item to be updated is selected, and then information is updated. Then, the averaged value and prediction value of the position and speed of the item are calculated using equations (1) in step S24. Then, the process proceeds to step S29.

On the other hand, if it is determined that the cluster selected in step S22 is not close to any existing item, it is determined whether the number of items reaches the maximum number of items in step S25. As a result, if it is determined that the number of items reaches the maximum number of items, the process proceeds to step S26. On the other hand, if it is determined that the number of items is lower than the maximum number of items, the process proceeds to step S27. In step S26, the oldest set item is deleted, and the process proceeds to step S27.

In step S27, the selected cluster is stored as a new item. Then in step S28, the averaged value and prediction value of the position and speed of the new item are calculated using equations (1). Then, the process proceeds to step S29.

In step S29, the calculation values of the position and the speed that have been calculated in step S24 or S28 are output to a display device or the like. In next step S30, it is determined whether the process for all of the clusters formed in the clustering process have finished, and if there remains any cluster not yet processed, the process returns to step S21 to perform a process of steps S21 to S29 again.

Figure 6A:
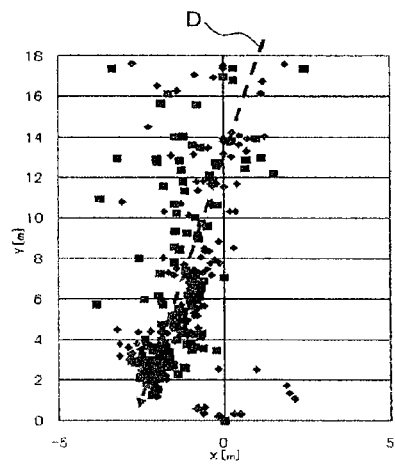
FIGS. 6A, 6B, 6C, 6D and 6E are graphs illustrating an example of tracking a vehicle by the radar device according to the first embodiment.
Figure 6B:
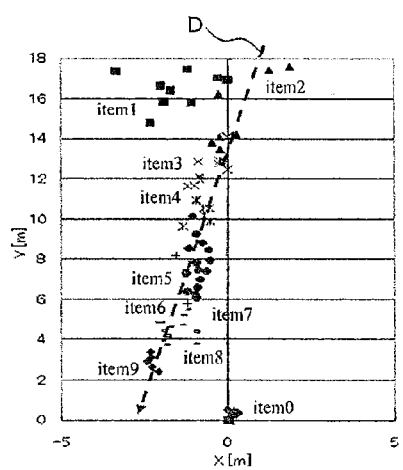
Figure 6C:
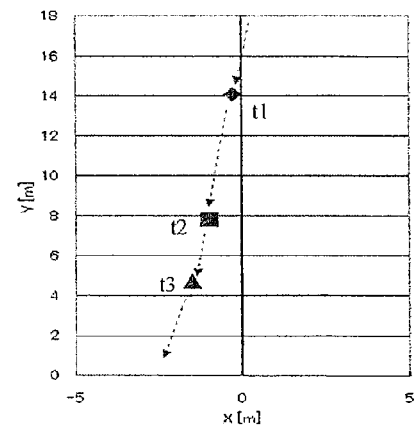
Figure 6D:
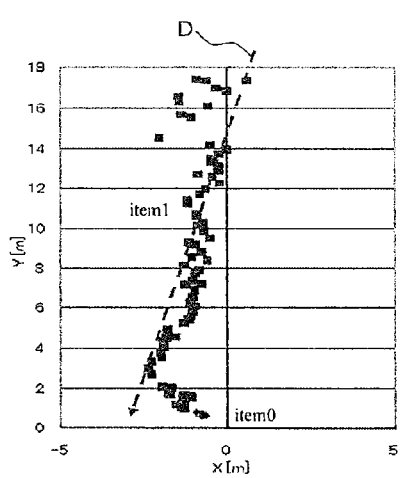
Figure 6E:
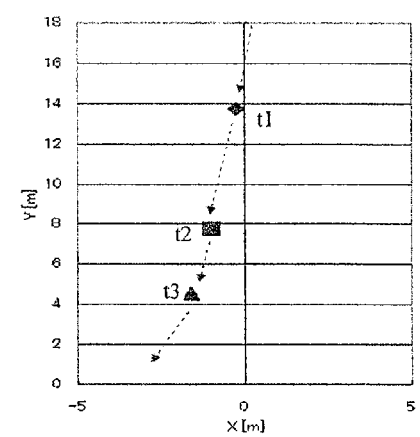

An example where a running vehicle is tracked using the radar device 100 of this embodiment is hereinafter described using FIGS. 6A-6E. In FIGS. 6A-6E, the horizontal axis X is defined to be the width direction of the radar device 100, and the vertical axis Y is defined to be a direction of the center axis C illustrated in FIG. 2. The vehicle running in the direction of arrow D is tracked by using the radar device 100. FIG. 6A illustrates all of the detected data set before the tracking process. In FIGS. 6B and 6C, a result of tracking using circular cluster areas is illustrated, and in FIGS. 6D and 6E, a result of tracking using fan-shaped cluster areas is illustrated. The result illustrated in FIGS. 6D and 6E is of the tracking using the radar device 100 of this embodiment.

On FIGS. 6B and 6D, tracking results of all scans are superimposed. Among the tracking results, the results of the tracking process on the detected data obtained by scans at time t=t1, t2, t3 are extracted and illustrated in FIGS. 6C and 6E. By comparing FIGS. 6B and 6D illustrating the detected data set after the tracking process with FIG. 6A illustrating those before the tracking process, it can be seen that detected data around the running track of the vehicle are selected by the tracking process.

It can be seen that when circular cluster areas are used, the running vehicle may be divided into multiple items in the process of the tracking as illustrated in FIG. 6B. On the other hand, when fan-shaped cluster areas of this embodiment are used, the running vehicle can be recognized as almost one item as illustrated in FIG. 6D. As described above, the shape of cluster areas used for tracking significantly affects the tracking result, and the use of fan-shaped cluster areas allows for appropriate tracking of an item (target) to be observed.

According to the radar device 100 of this embodiment, the clustering process and the tracking process are performed by using fan-shaped cluster areas, whereby the load of the clustering process can be reduced and the tracking performance can be improved.

Second Embodiment

Figure 7:
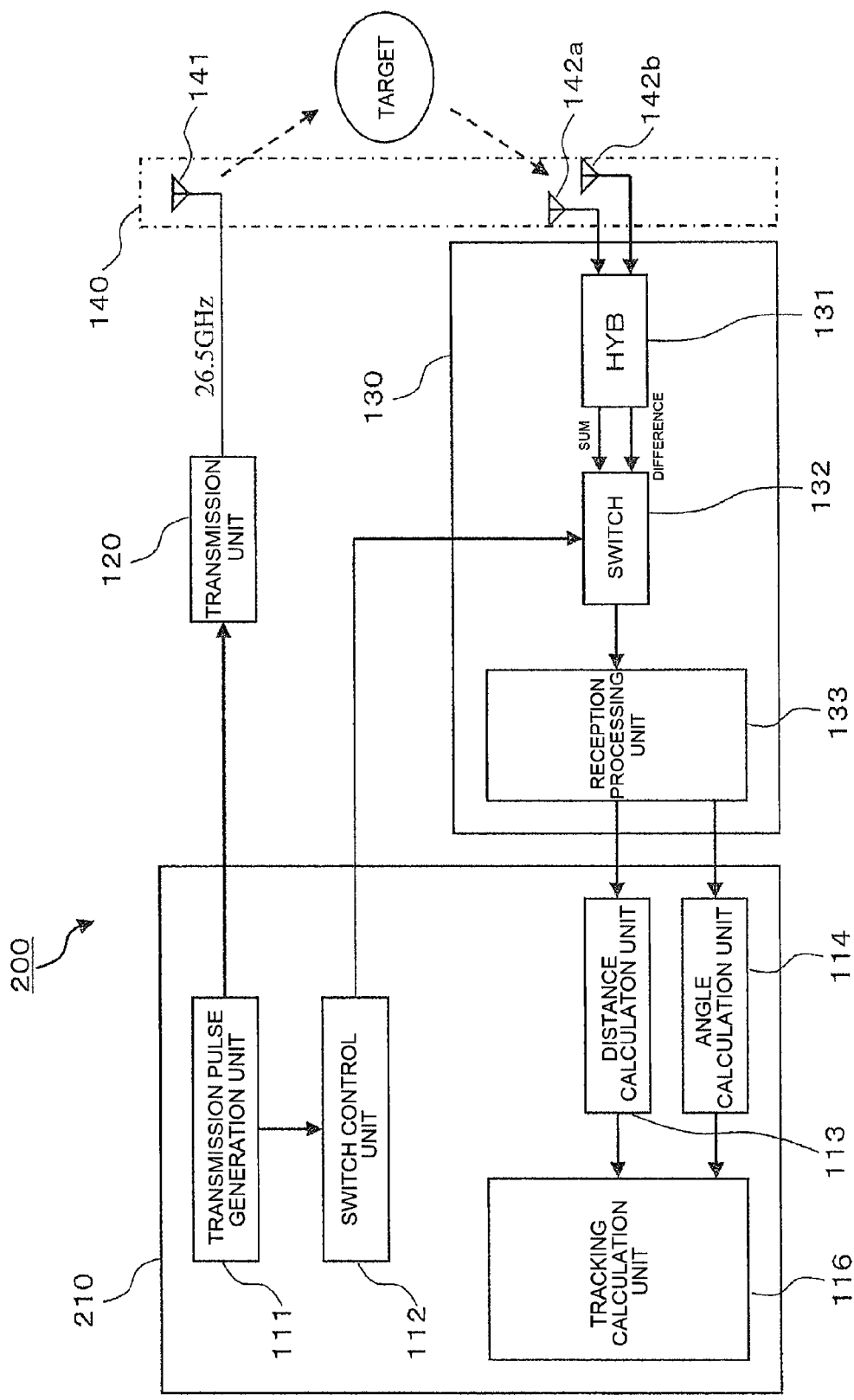
FIG. 7 is a block diagram illustrating a configuration of a radar device according to a second embodiment of the present invention.
Figure 8A:
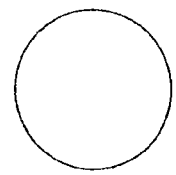
FIGS. 8A, 8B, 8C and 8D illustrate an example of a shape of a conventional cluster area.
Figure 8B:
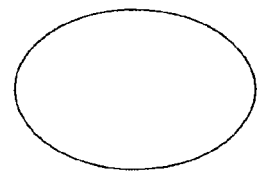
Figure 8C:
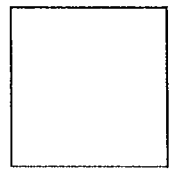
Figure 8D:
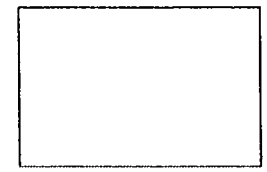
Figure 9:
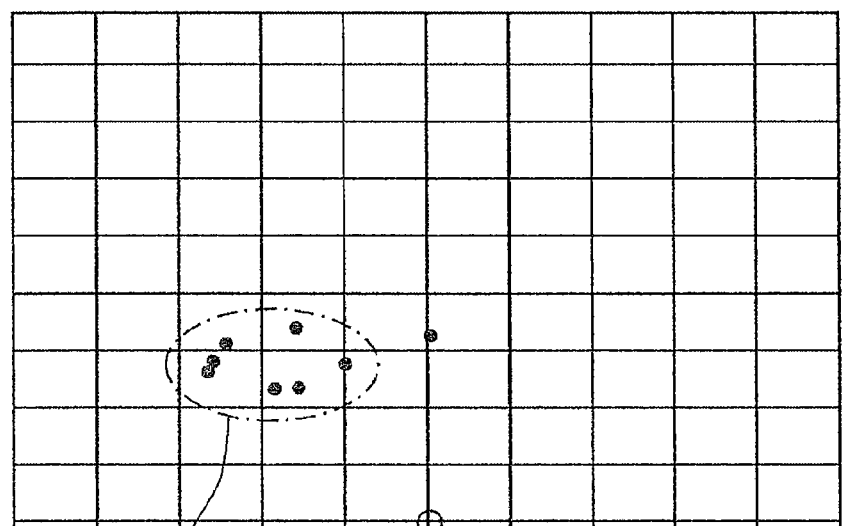
FIG. 9 illustrates an example of detection signals reflected by a target.

A radar device according to a second embodiment of the present invention will be described below referring to FIG. 7. FIG. 7 is a block diagram illustrating a configuration of a radar device 200 of this embodiment. In the radar device 200 of this embodiment, a signal processing unit 210 is configured without having the relative speed calculation unit 115. Because of this configuration, an detected data set output to the tracking calculation unit 116 does not include relative speed data.

It is preferable to group detected data into clusters using relative speed in order to improve the performance of the clustering process and the tracking process. Therefore, smoothing and prediction of position and speed using the al tracking method are performed using the following equations.

Averaged Position: $x_{sk}=x_{pk}+\alpha(x_{ok}-x_{pk})$

Averaged Speed: $v_{sk}=v_{sk-1}+\beta/T(x_{ok}-x_{pk})$

Prediction Position: $x_{pk}=x_{sk-1}+T\cdot v_{sk-1}$

Prediction Speed: $v_{pk}=v_{sk-1}$ (2)

The relative speed is calculated from an amount of movement within a time interval T, whereby the load of the clustering process can be reduced and the tracking performance can be improved using fan-shaped cluster areas similarly to the first embodiment.

Note that the description in the embodiments is for an example of a radar device according to the present invention, and the invention is not limited thereto. The detailed configuration and detailed operation of the radar device according to the embodiments may be appropriately changed without departing from the spirit of the present invention.

REFERENCE SIGNS LIST 100, 200 radar device
110, 210 signal processing unit
111 transmission pulse generation unit
112 switch control unit
113 distance calculation unit
114 angle calculation unit
115 relative speed calculation unit
116 tracking calculation unit
120 transmission unit
130 reception unit
131 hybrid (HYB)
132 switch
133 reception processing unit
140 antenna section
141 transmission antenna
142 reception antenna

The invention claimed is:

1. A radar device that radiates a transmission signal from a predetermined measure point, receives reflected waves that have been reflected by targets to be measured to obtain detected data including at least position information, and detect the targets by processing the detected data, the radar device comprising:
a tracking processing unit configured to:
group the detected data into one or more cluster areas using at least the position information, that defines each of the cluster areas as one of clusters,
perform a clustering process, in which a central value of each of the clusters is calculated, and based on the position information of the detected data, determine whether a detected datum is within a predetermined distance from an area of an already formed one of the clusters, and when the detected datum is within the predetermined distance from the area of the already formed one of the clusters, update at least one of a gravity center, a width, and a height of the already formed one of the clusters, and
perform a tracking process, in which each of the targets is defined as one item, a distance between a position of each of the items that have been detected and the central value of each of the clusters is calculated, when the distance for any of the items is determined to have a predetermined value or less, a cluster is determined to correspond to an item, and when the distances from all of the items that have been detected are more than the predetermined value, the cluster is determined as a new item, an averaged position that is the position which has been averaged is calculated using the central value of the cluster for each of the items, wherein
each of the cluster areas is a fan-shaped cluster area that has a center at the measure point and that is surrounded by:
two arcs having identical center angles and different radii; and
two line segments on the different radii.

2. The radar device according to claim 1, wherein the detected data includes relative speed information of a target as viewed from the measure point,
in the clustering process, the detected data having relative speeds which fall within an identical relative speed range are grouped into one of the clusters that is identical, and an average speed that is an average of the relative speeds is calculated for each of the clusters, and in the tracking process, when a difference between an averaged speed of the item and the average speed of the cluster is in a predetermined range, the cluster is determined to correspond to the item, and the averaged speed is calculated using the average speed of the cluster for each of the items.

3. The radar device according to claim 1, wherein the transmission signal is a pulse signal having a predetermined pulse width.

4. The radar device according to claim 2, wherein the transmission signal is a pulse signal having a predetermined pulse width.

5. The radar device according to claim 3, wherein the pulse signal is an Ultra Wide Band (UWB) radio signal.

6. The radar device according to claim 4, wherein the pulse signal is an Ultra Wide Band (UWB) radio signal.

7. The radar device according to claim 1, wherein when the detected datum is not within the predetermined distance from the area of the already formed one of the clusters, the tracking processing unit is configured to form a new cluster.

8. The radar device according to claim 7, wherein when the new cluster is formed, the tracking processing unit is configured to calculate at least one of a gravity center, a width, and a height of the new cluster.

9. A radar device that radiates a transmission signal from a predetermined measure point, receives reflected waves that have been reflected by targets to be measured to obtain detected data including at least position information, and detect the targets by processing the detected data, the radar device comprising:
circuitry configured to:
group the detected data into one or more cluster areas using at least the position information, that defines each of the cluster areas as one of clusters,
perform a clustering process, in which a central value of each of the clusters is calculated, and based on the position information of the detected data, determine whether a detected datum is within a predetermined distance from an area of an already formed one of the clusters, and when the detected datum is within the predetermined distance from the area of the already formed one of the clusters, update at least one of a gravity center, a width, and a height of the already formed one of the clusters, and
perform a tracking process, in which each of the targets is defined as one item, a distance between a position of each of the items that have been detected and the central value of each of the clusters is calculated, when the distance for any of the items is determined to have a predetermined value or less, a cluster is determined to correspond to an item, and when the distances from all of the items that have been detected are more than the predetermined value, the cluster is determined as a new item, an averaged position that is the position which has been averaged is calculated using the central value of the cluster for each of the items, wherein
each of the cluster areas is a fan-shaped cluster area that has a center at the measure point and that is surrounded by:
two arcs having identical center angles and different radii; and
two line segments on the different radii.

* * * * *